US009288187B2

(12) United States Patent
Iloglu et al.

(10) Patent No.: US 9,288,187 B2
(45) Date of Patent: *Mar. 15, 2016

(54) EXTERNALLY CONTROLLED REACHABILITY IN VIRTUAL PRIVATE NETWORKS

(75) Inventors: Ali Murat Iloglu, Laurence Harbor, NJ (US); Han Q. Nguyen, Marlboro, NJ (US)

(73) Assignee: AT&T INTELLECTUAL PROPERTY II, L.P., Atlanta, GA (US)

( * ) Notice: Subject to any disclaimer, the term of this patent is extended or adjusted under 35 U.S.C. 154(b) by 906 days.

This patent is subject to a terminal disclaimer.

(21) Appl. No.: 11/981,881

(22) Filed: Oct. 31, 2007

(65) Prior Publication Data

US 2008/0065783 A1  Mar. 13, 2008

Related U.S. Application Data

(63) Continuation of application No. 10/768,518, filed on Jan. 30, 2004, now Pat. No. 7,313,605.

(60) Provisional application No. 60/481,057, filed on Jul. 3, 2003.

(51) Int. Cl.
*G06F 15/16* (2006.01)
*G06F 9/00* (2006.01)
*H04L 29/06* (2006.01)

(52) U.S. Cl.
CPC .................. *H04L 63/0272* (2013.01)

(58) Field of Classification Search
CPC ............ H04L 63/0272; H04L 12/4641; H04L 12/4675; H04L 12/4679; H04L 63/104
USPC .......................................................... 709/219
See application file for complete search history.

(56) References Cited

U.S. PATENT DOCUMENTS

| 5,790,548 | A | 8/1998 | Sistanizadeh et al. |
| 6,088,443 | A | 7/2000 | Darland et al. |
| 6,532,088 | B1 | 3/2003 | Dantu et al. |
| 6,778,498 | B2 | 8/2004 | McDysan |

(Continued)

FOREIGN PATENT DOCUMENTS

| EP | 1093255 A | 4/2001 |
| EP | 1 168 718 A | 1/2002 |

(Continued)

OTHER PUBLICATIONS

Bhagavathula, R., et al., "Mobile IP and Virtual Private Networks", BTC 2002—Fall, 2002, IEEE 56yh Vehicular Technology Conference Proceedings, IEEE, US vol. 1 of 4, 2002.

(Continued)

*Primary Examiner* — Phuoc Nguyen
*Assistant Examiner* — Kishin G Belani
(74) *Attorney, Agent, or Firm* — Hanley, Flight & Zimmerman, LLC

(57) ABSTRACT

A network that supports VPNs is enhanced to allow users in one VPN to communicate with users in another VPN in the course of executing a predefined application, such as VoIP. This capability is achieved dynamically by enabling a device that can communicate with the network elements that operate to normally prohibit inter-VPN communication to direct those network elements to enable such communication, at least for the purposes of specific applications.

17 Claims, 2 Drawing Sheets

(56) References Cited

U.S. PATENT DOCUMENTS

| | | |
|---|---|---|
| 7,079,499 B1 | 7/2006 | Akhtar et al. |
| 7,092,389 B2 | 8/2006 | Chase et al. |
| 7,099,319 B2 | 8/2006 | Boden et al. |
| 7,106,740 B1 | 9/2006 | Leelanivas et al. |
| 7,120,150 B2 | 10/2006 | Chase et al. |
| 7,120,682 B1 * | 10/2006 | Salama .................. 709/222 |
| 7,130,393 B2 | 10/2006 | Hall, Jr. et al. |
| 7,185,106 B1 | 2/2007 | Moberg et al. |
| 7,379,465 B2 | 5/2008 | Aysan et al. |
| 7,411,955 B2 | 8/2008 | Li et al. |
| 7,447,151 B2 | 11/2008 | McDysan |
| 7,467,227 B1 | 12/2008 | Nguyen et al. |
| 7,676,579 B2 | 3/2010 | Harris et al. |
| 7,769,006 B1 | 8/2010 | Chase et al. |
| 7,881,311 B2 | 2/2011 | Sakamoto et al. |
| 7,895,334 B1 | 2/2011 | Tu et al. |
| 8,040,896 B2 | 10/2011 | Nguyen et al. |
| 8,081,631 B1 | 12/2011 | Chase et al. |
| 8,089,871 B2 | 1/2012 | Iloglu et al. |
| 8,670,446 B2 | 3/2014 | Chase et al. |
| 2001/0005381 A1 | 6/2001 | Sugiyama |
| 2002/0002687 A1 * | 1/2002 | Chantrain et al. ............ 713/201 |
| 2002/0061101 A1 | 5/2002 | Hall et al. |
| 2002/0103998 A1 | 8/2002 | DeBruine |
| 2003/0016672 A1 | 1/2003 | Rosen et al. |
| 2003/0046587 A1 | 3/2003 | Bheemarasetti et al. |
| 2003/0079043 A1 | 4/2003 | Chang et al. |
| 2003/0149787 A1 | 8/2003 | Mangan |
| 2003/0225907 A1 | 12/2003 | Krishnan |
| 2004/0006708 A1 * | 1/2004 | Mukherjee et al. ........... 713/201 |
| 2004/0062204 A1 | 4/2004 | Bearden et al. |
| 2004/0208122 A1 | 10/2004 | McDysan |
| 2004/0255028 A1 * | 12/2004 | Chu et al. ..................... 709/227 |
| 2006/0029035 A1 | 2/2006 | Chase et al. |
| 2006/0206606 A1 | 9/2006 | Iloglu et al. |
| 2007/0022477 A1 | 1/2007 | Larson |
| 2014/0044132 A1 | 2/2014 | Chase et al. |

FOREIGN PATENT DOCUMENTS

| | | |
|---|---|---|
| WO | WO 98/59467 A | 12/1998 |
| WO | WO 01/16766 A | 3/2001 |

OTHER PUBLICATIONS

United States Patent and Trademark Office, "Non-Final Office Action," issued in connection with U.S. Appl. No. 10/768,518, on Apr. 10, 2007 (23 pages).

United States Patent and Trademark Office, "Notice of Allowance," issued in connection with U.S. Appl. No. 10/768,518, on Sep. 13, 2007 (11 pages).

* cited by examiner

EXTERNALLY CONTROLLED REACHABILITY IN VIRTUAL PRIVATE NETWORKS

RELATED APPLICATIONS

This application is related to provisional application No. 60/481,057, filed Jul. 3, 2003, which is hereby incorporated by reference. This application is also a continuation application of Ser. No. 10/768,518, filed Jan. 30, 2004 now U.S. Pat. No. 7,313,605

BACKGROUND OF THE INVENTION

This invention relates to virtual private networks (VPNs) and, more particularly, to the provision of temporary access for predetermined applications across VPNs.

Consider a network operated by a Provider (or a cooperating set of Providers) that includes routers, and Provider Edge (PE) routers through which the provider connects to customer sites. More particularly, customers connect to PEs through Customer Edge (CE) devices, where a CE device can be a host, a switch, or a router to which numerous customer systems (for example, PCs) can be connected. Consider further that any number of subsets can be created from the set of sites, and the following rule is established: two sites may have IP interconnectivity through the network only if both of the two sites belong to some given one of those subsets. Each of the subsets thus created forms a virtual private network (VPN), which is defined, effectively, by the fact that only members that belong to a common VPN can communicate with each other.

One known arrangement that accommodates VPNs is the MPLS (multi-protocol label switching) network. A description of the network is found in E. Rosen and Y. Rekhter, titled "BGP/MPLS VPNs," Internet Engineering Task Force (IETF), RFC2547, March 1999, http://www.faqs.org/rfcs/rfc2547.html, which is incorporated herein by reference.

It is precisely the defining attribute of VPNs—that of not allowing two systems to intercommunicate unless they both belong to some common VPN—that presents a problem for some applications, where it is desirable to allow systems to communicate without regard to VPNs. One such application, illustratively, is voice over IP (VoIP), where, much like in the PSTN environment, it is desirable to allow any system A to communicate with any other system B, even if system B does not belong to any VPN to which system A belongs.

The conventional solution to this problem is to send packets to a PSTN gateway, "hop-off" to the PSTN, and re-enter the network at a gateway with which the destination site is willing to communicate. This assumes, of course that the VPNs are willing to accept packets from the PSTN. Another solution is to use special crossover routers, but that represents an expense.

SUMMARY OF THE INVENTION

An advance in the art is realized in a network that supports VPNs, for example a multi-protocol label-switched network (MPLS), by allowing users in one VPN to communicate with users in another VPN in the course of executing a predefined application, such as VoIP. This capability is achieved dynamically by enabling a device that can communicate with the network elements that operate to normally prohibit inter-VPN communication to direct those network elements to enable such communication, at least for the purposes of the desired application. In the case of an MPLS network that supports VPNs and in the case he desired application being VoIP, the aforementioned device may be a combination of a route server and a call control element, and the aforementioned network elements are the edge routers of the MPLS network's provider, with edge routers' associated VRF (Virtual Routing Forwarding) tables.

DETAILED DESCRIPTION

Figure 1:
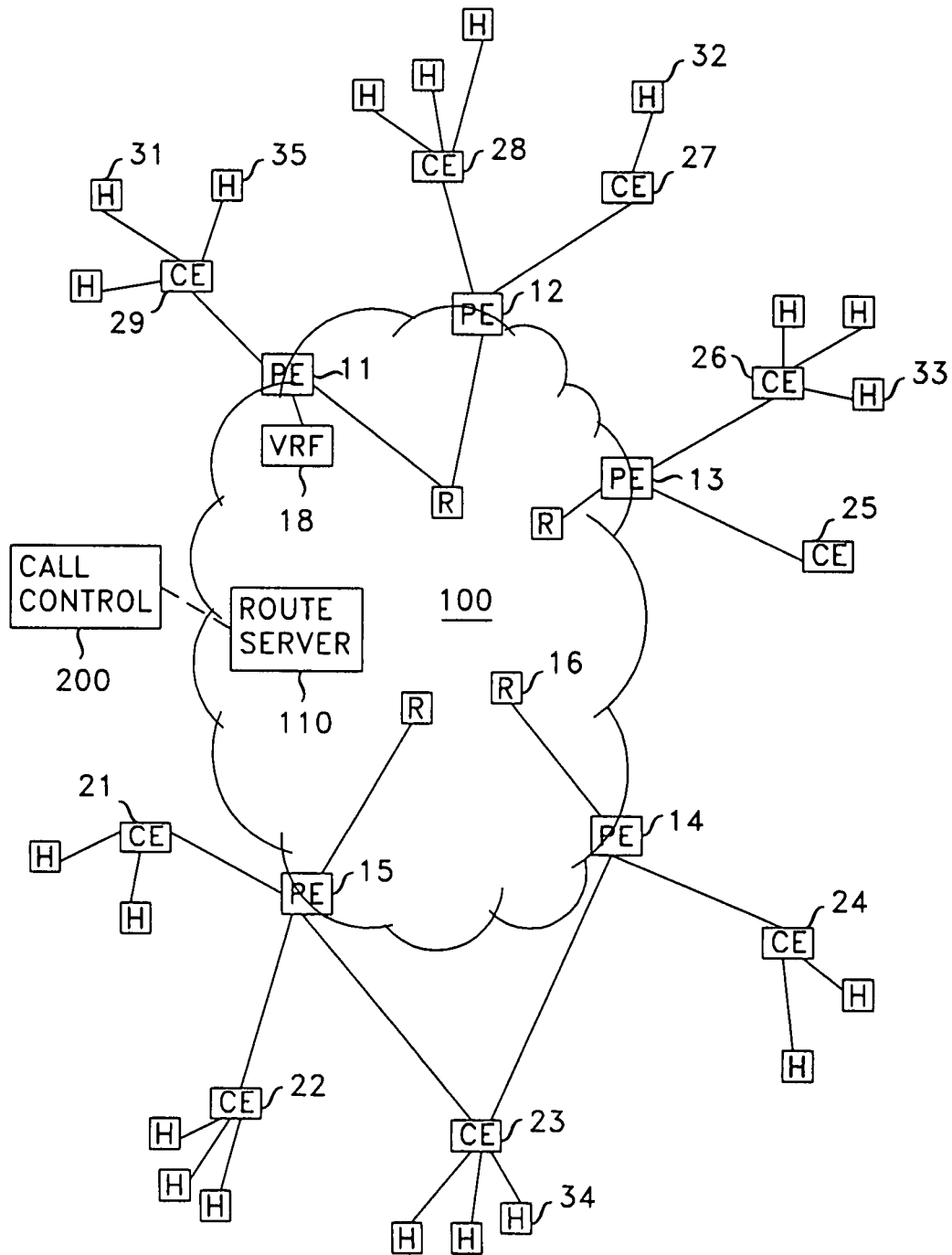
FIG. 1 depicts a network in conformance with the principles disclosed herein.

FIG. 1 illustrates a network 100 that is adapted for provisioning VPNs. It includes edge routers 11 through 15 (marked "PE" for "Provider Edge" router) and internal (non-edge) routers, R, such as the one labeled 16. Each PE is connected to one or more devices outside the network, and for purposes of this exposition, each of those devices is termed a Customer Edge device, or CE device. Thus, CE 29 is connected to PE 11, CEs 28 and 27 are connected to PE 12, CEs 26 and 25 are connected to PE 13, CEs 24 and 23 are connected to PE 14, and CEs 23, 22 and 21 are connected to PE 15. It may be noted that, in addition to more than one CE being connected to a given PE, the FIG. 1 arrangement includes a CE being connected to more than one PE (CE23 being connected to PEs 14 and 15).

A CE device can be simply a host or a personal computer (for example, CE 25), but when it serves to couple numerous systems to network 100, which typically happens when the systems all belong to a single commercial enterprise, the CE is a switch, or a router. FIG. 1 depicts numerous systems (blocks marked "H"), such as element 31, that are connected to various ones of CE's. These systems may be hosts, workstations, personal computers, etc.

Not all of the CE's have to belong to a VPN, but for sake of simplicity the exposition below assumes that they do. Illustratively, CEs 29, 27, 26, 25 and 24 belong to VPN A, CEs 28 23, and 21 belong to VPN B, and CEs 22 and 23 belong to VPN C. It may be noted that not each and every one of the systems that is coupled to CE's 23 must belongs to both VPN B and C; only that at least one of the systems so belongs, for example system 34 (which, for example, has the IP address 101.200.031.155).

Implementation of the VPN concept in the MPLS network 100 is carried out with the aid of a routing and forwarding (VRF) table that is associated with each PE. For sake of clarity, FIG. 1 explicitly shows only one VRF table, 18. The others are subsumed within the respective PEs.

The aforementioned RFC2547 describes in fair detail the process for creating the VRF tables in the context of MPLS networks, and a reader who is interested in those details is invited to read the this RFC and the documents that are referenced therein. For purposes of this invention, however, suffice it to say that, in order to implement the VPN functionality, each PE may include a VRF table not unlike Table 1, depicted below, that contains at least a Source-System ID, a Destination ID, and a Route ID. The table shows a few entries of VRF 18, where, for example, system 31 has the IP address 137.072.152.011, system 35 has the IP address 137.072.152.012, system 32 has the IP address of 143.001.101.100, and system 33 has the IP address of 201.123.122.002.

TABLE 1

| Source ID | Destination ID | Route |
|---|---|---|
| 137.072.152.011 | 143.001.101.100 | RT1 |
| 137.072.152.011 | 201.123.122.002 | RT2 |
| (137.072.152.011) | (other destinations) | (other routes) |
| 137.072.152.012 | 143.001.101.100 | RT1' |
| 137.072.152.012 | 201.123.122.002 | RT2' |
| (137.072.152.012) | (other destinations) | (other routes) |
| (other sources) | (other destinations) | (other routes) |

What Table 1 specifies is that when a packet arrives at PE 11, the packet's source address and destination address are examined. If a row entry in VRF table 18 is found that corresponds to this tuple then the route is identified and used for routing and forwarding the packet. Otherwise, the packet is discarded. For example, if system 31 (IP address 137.072.152.011) sends a packet to PE 11 that is destined to system 33 (IP address 201.123.122.002), the second row of the table is selected, route RT2 is identified, and packet is forwarded. If, however, system 31 sends a packet to PE 11 that is destined to system 34 (IP address 101.200.031.155), no corresponding row in CRF table 18 is found, so the packet is discarded. A different set of routes (RT1' and RT2') is shown for a different system that is connected to CE 29, but typically the same set of routes would be employed (i.e., RT1'=RT1 and RT2'=RT2).

The FIG. 1 arrangement also includes route server 100 within network 100 that communicates with the PEs, and with call control element 200. In accord with the instant embodiment of this invention, one function of elements 110 and 200 is to provide the ability to make inter-VPN connections for particular applications, in spite of the general prohibition against inter-VPN connections. Illustratively, elements 200 and 110 cooperate to allow VoIP connectivity over network 100.

As an aside, the table above does not explicitly show it, but all VRF tables include entries for the IP address of elements 200 and 110, so that packets that are destined to these elements are forwarded. Alternatively, these entries might be in a second, default, VRF table that might also implement permission to reach predetermined gateways that allow systems that belong to a VPN to nevertheless connect to the public Internet, albeit under the watchful processing of the gateway.

Figure 2:
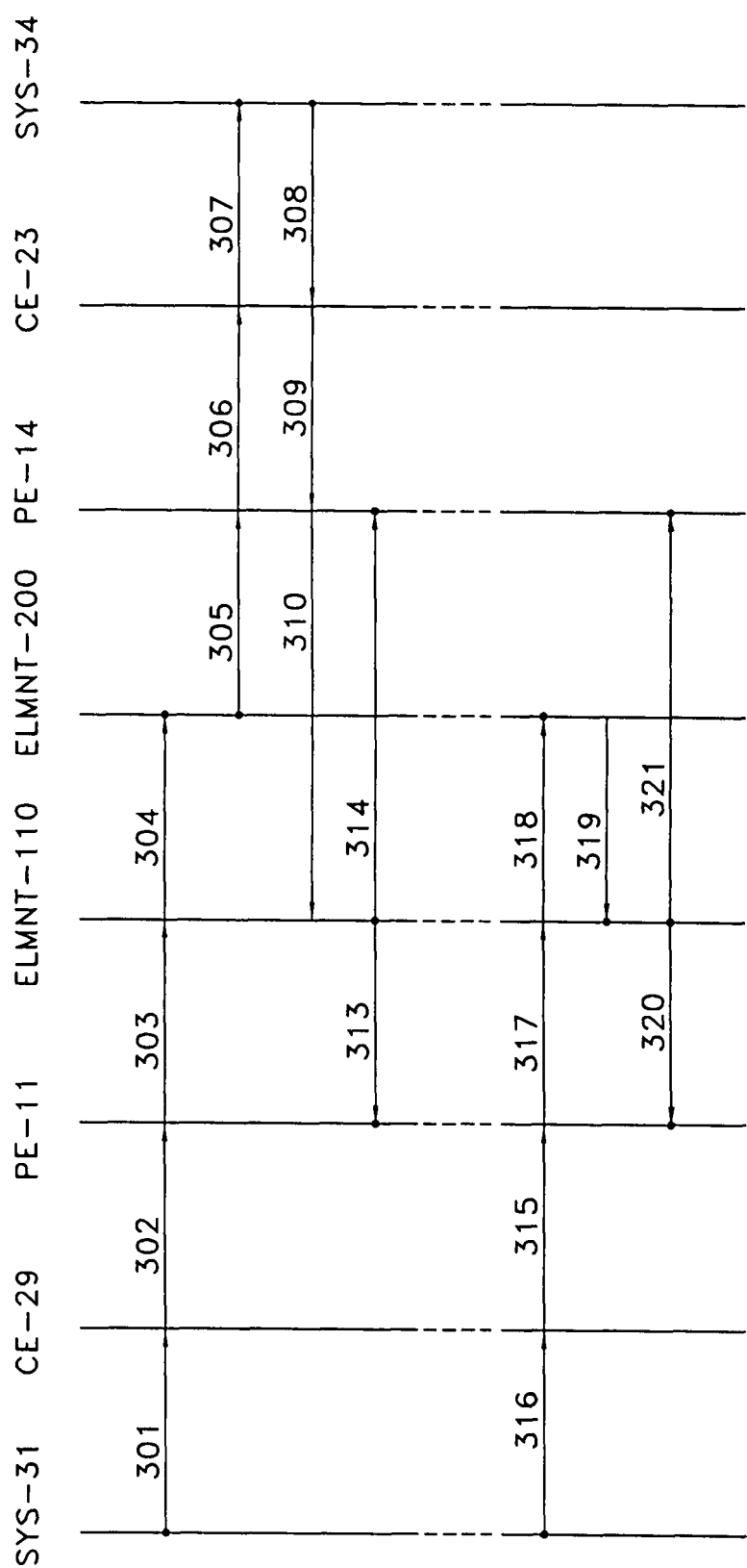
FIG. 2 shows the flow of messages that allow inter-VPN communication for particular applications.

FIG. 2 presents a diagram that presents one embodiment that comports with the principles disclosed herein where, illustratively, system 31 wishes to place a VoIP call to system 34. Presumably, system 31 knows the party at system 34 by other than an IP address, for example, a telephone number. Therefore, when it initiates the VoIP application, it specifies the telephone number of the intended called party. Responsively, the application sends a predetermined call initiation packet 301 that is addressed to call control element 200. This packet specifies its own IP address and its VPN ID, and specifies the telephone number of the called party with which communication is sought to be established. This packet (301) is forwarded to call control element 200 via CE 29 (302), PE 11 (303), element 110 (304), where first the application is examined.

In the illustrative case, the application is a VoIP and, it is assumed, that call control element 200 investigates and concludes that a connection is to be permitted. A connection might be declined if the application is not one that is acceptable to call control element 200, or if either the calling or the called parties are such that a connection ought to be declined.

Once it is concluded that a connection ought to be allowed, a database is consulted to identify the IP address of the called party. Element 200 thus obtains the IP address of system 34 (101.200.031.155) and sends a query packet (306) to the obtained IP address 101.200.031.155 via PE 14 (306) and CE 23 (307). The query packet requests the assigned VPN ID of the called party system. A response packet (308) is launched toward element 200, traveling via CE 23 (309) PE 12 (310), and element 110. Element 110 captures the VPN ID identified in the response packet, as well as the called party's IP address and IP address of PE 14.

The packet arriving at element 110 from the calling party (303) is also perused to identify the calling party's IP address, VPN ID and IP address of PE 11 and, therefore at this point, element 110 has all of the necessary calling party and called party information to enable element 110 to choose a route for packets emanating from system 31 that are destined to system 34 (route X), and a route for packets emanating from system 34 that are destined to system 31 (route Y). Having chosen the necessary routes, element 110 sends a message (313) to PE 11 directing it to install in VRF table 18 the entry shown in Table 2.

TABLE 2

| Source ID | Destination ID | Route |
|---|---|---|
| 137.072.152.011 | 101.200.031.155 | X |

Similarly, element 110 sends a message (314) to the VRF table of PE 14 directing it to install the entry shown in Table 3.

TABLE 3

| Source ID | Destination ID | Route |
|---|---|---|
| 101.200.031.155 | 137.072.152.011 | Y |

After the relevant PEs have their associated VRF tables modified, communication can proceed between systems 31 and 34 even though the two systems belong to different VPNs.

One has to alert system 34 of the incoming call, system 34 has to effectively "go off hook," that information needs to be communicated to system 31, etc. All of these processes are part of the conventional VoIP protocol, which forms no part of this invention. Therefore, these protocols are discussed no further herein. It is presumed, however, that communication does get established and maintained for the duration of the call.

Once the user of system 31 (or the user of system 34) terminates the VoIP application, a message is sent to element 200 by the party that terminated the communication (315, 315, 317, 318), informing the element 200 that the communication terminates. In response, element 200 sends a message (319) to element 110 informing it that the ability of terminals 31 and 34 to intercommunicate may be removed. In turn, element 110 sends a message to PE 11 (320) and to PE 14 (321) directing them to remove the VRF entries that were previously inserted.

It may be noted that once the entries described above are inserted into the VRF tables, any and all communication can be conducted between terminals 31 and 34. It is expected, however, that situations may exist where that is undesirable. Allowing an employee at, for example, AT&T, to use VoIP communication with an employee of, for example, Sprint, does not necessarily mean that data communication between them should be allowed. This loophole can be blocked by simply adding a column to the VRF table that specifies a particular flow, port, or other attribute of the established VoIP communication. Packets that possess the specified attribute are forwarded, while other packets are blocked.

The above disclosed the principles of this invention by describing one illustrative embodiment, but it should be realized that other embodiment that are somewhat different from the above description may still be encompassed by the this invention, as defined by the accompanying claims. For example, the invention is not limited to MPLS networks, is not limited to using a combination of a route server and a call control element to overcome the prohibition against inter-VPN communication, and is not limited to the VoIP application (or any other real-time application such as Video over IP). For instance, communication may be permitted pursuant to any particularly specified application to which both of the entities that established the affected VPNs agree. Also, there is no requirement to remove the ability for two systems to intercommunicate as disclosed above as soon the underlying application terminates. Applications can exist where traffic load is reduced by maintaining such an ability, once established, for some preselected time. Also, the above uses source address in the VRF table, but it may be noted that IP traffic that is associated with a particular VPN employs a particular physical or logical connection between CE and PE routers. Therefore, the source address column of the VRF tables ca can, in such applications, be replaced by a "connection" column. Of course, additional elements may also be included, such as firewalls, etc.

The invention claimed is:

1. A method comprising:
receiving, at a call controller, a request for a first device in a first virtual private network to communicate with a second device in a second virtual private network using a connection that is prohibited between the first and second virtual private networks;
in response to the request:
causing a first provider edge router associated with the first device to store in a first virtual routing forwarding table a first entry defining a route between the first device and the second device, the first entry to indicate that the second device belongs to the first virtual private network;
causing a second provider edge router associated with the second device to store in a second virtual routing forwarding table a second entry defining the route between the first device and the second device, the second entry to indicate that the first device belongs to the second virtual private network; and
permitting the connection to allow the first device to communicate with the second device across the first and second virtual private networks based on the first entry in the first virtual routing forwarding table and the second entry in the second virtual routing forwarding table; and
causing removal of the first entry from the first virtual routing forwarding table and the second entry from the second virtual routing forwarding table when use of the connection is terminated to prevent subsequent communication between the first and second devices via the connection.

2. The method as defined in claim 1, wherein the connection is a voice over internet protocol connection between the first and second devices.

3. The method as defined in claim 1, wherein the first entry includes a first address of the first device as a first source identifier and a second address of the second device as a first destination identifier, and the second entry includes the first address of the first device as a second destination identifier and the second address of the second device as a second source identifier.

4. The method as defined in claim 1, wherein causing the removal of the first entry from the first virtual routing forwarding table comprises includes:
receiving a message from one of the first device or the second device indicating that the use of the connection is terminated; and
causing the first virtual routing forwarding table to remove the first entry in response to the message.

5. The method as defined in claim 1, wherein the call controller is separate from the first and second devices.

6. The method as defined in claim 1, wherein the connection is established temporarily during use of a particular application specified in the request.

7. A call controller comprising:
a processor; and
a memory to store machine readable instructions that, when executed by the processor, cause the processor to perform operations comprising:
determining a request for a first device in a first virtual private network to communicate with a second device in a second virtual private network involves a connection that is prohibited between the first and second virtual private networks;
in response to the request:
causing a first provider edge router associated with the first device to store in a first virtual routing forwarding table a first entry defining a route between the first device and the second device, first entry to indicate that the second device belongs to the first virtual private network; and
causing a second provider edge router associated with the second device to store in a second virtual routing forwarding table a second entry defining the route between the first device and the second device, the second entry to indicate that the first device belongs to the second virtual private network, the first and second entries to permit the first device to communicate with the second device across the first and second virtual private networks via the connection; and
causing removal of the first entry from the first virtual routing forwarding table and the second entry from the second virtual routing forwarding table when use of the connection is terminated to prevent subsequent communication between the first and second devices via the connection.

8. The call controller as defined in claim 7, wherein the connection is a voice over internet protocol connection between the first and second devices.

9. The call controller as defined in claim 7, wherein the first entry includes a first address of the first device as a first source identifier and a second address of the second device as a first destination identifier, and the second entry includes the first address of the first device as a second destination identifier and the second address of the second device as a second source identifier.

10. The call controller as defined in claim 7, wherein causing the removal of the first entry from the first virtual routing forwarding table comprises includes:
accessing a message from one of the first device or the second device indicating that the use of the connection is terminated; and
causing the first virtual routing forwarding table to remove the first entry based on the message.

11. The call controller as defined in claim 10, wherein the call controller is separate from the first and second devices.

12. The call controller as defined in claim 7, wherein the connection is to be established temporarily during use of a particular application specified in the request.

13. A storage disk or storage device comprising instructions which, when executed, cause a call controller to perform operations comprising:
    in response to a request for a first device in a first virtual private network to communicate with a second device in a second virtual private network using a connection that is prohibited between the first and second virtual private networks:
    causing a first provider edge router associated with the first device to store in a first virtual routing forwarding table a first entry defining a route between the first device and the second device, first entry to indicate that the second device belongs to the first virtual private network;
    causing a second provider edge router associated with the second device to store in a second virtual routing forwarding table a second entry defining the route between the first device and the second device, the second entry to indicate that the first device belongs to the second virtual private network; and
    permitting the connection to allow the first device to communicate with the second device across the first and second virtual private networks based on the first entry in the first virtual routing forwarding table and the second entry in the second virtual routing forwarding table; and
    causing removal of the first entry from the first virtual routing forwarding table and the second entry from the second virtual routing forwarding table when use of the connection is terminated to prevent subsequent communication between the first and second devices via the connection.

14. The storage disk or storage device as defined in claim 13, wherein the request is to use a voice over internet protocol connection between the first and second devices.

15. The storage disk or storage device as defined in claim 13, wherein the first entry includes a first address of the first device as a first source identifier and a second address of the second device as a first destination identifier, and
    the second entry includes the first address of the first device as a second destination identifier and the second address of the second device as a second source identifier.

16. The storage disk or storage device as defined in claim 13, wherein causing the removal of the first entry from the first virtual routing forwarding table comprises includes: responding to a message from one of the first device or the second device indicating that the use of the connection is terminated by causing the first virtual routing forwarding table to remove the first entry based on the message.

17. The storage disk or storage device as defined in claim 13, wherein the connection is to be established temporarily during use of a particular application specified in the request.

* * * * *